(12) United States Patent
Ozawa et al.

(10) Patent No.: US 8,782,756 B2
(45) Date of Patent: Jul. 15, 2014

(54) TIME CLOCK

(75) Inventors: Kenji Ozawa, Chiba (JP); Koji Ehara, Chiba (JP)

(73) Assignee: Seiko Precision Inc., Narashino-Shi (JP)

( * ) Notice: Subject to any disclaimer, the term of this patent is extended or adjusted under 35 U.S.C. 154(b) by 0 days.

(21) Appl. No.: 13/018,719

(22) Filed: Feb. 1, 2011

(65) Prior Publication Data

US 2011/0131637 A1    Jun. 2, 2011

Related U.S. Application Data

(63) Continuation of application No. PCT/JP2009/062628, filed on Jul. 10, 2009.

(30) Foreign Application Priority Data

Aug. 6, 2008  (JP) ................. 2008-203634

(51) Int. Cl.

| G06F 21/00 | (2013.01) |
|---|---|
| H04L 29/06 | (2006.01) |
| G04B 45/00 | (2006.01) |
| G06K 19/00 | (2006.01) |
| H04N 9/80 | (2006.01) |
| H04N 7/167 | (2011.01) |
| H04K 1/00 | (2006.01) |
| G06F 21/34 | (2013.01) |
| G06F 12/14 | (2006.01) |
| H04B 7/26 | (2006.01) |

(52) U.S. Cl.
USPC ............... 726/5; 713/184; 713/186; 709/203; 380/241; 380/277; 368/41; 235/377; 235/482; 235/494; 386/252

(58) Field of Classification Search
USPC ............... 726/5; 713/186, 183, 184; 709/203; 380/277, 241; 368/41; 235/377, 482, 235/494; 386/252
See application file for complete search history.

(56) References Cited

U.S. PATENT DOCUMENTS 6,088,303 A * 7/2000 Oishi ............................. 368/41
6,393,126 B1 * 5/2002 van der Kaay et al. ....... 380/241
(Continued)

FOREIGN PATENT DOCUMENTS

| CN | 1359086 | 7/2002 |
|---|---|---|
| CN | 2819328 | 9/2006 |

(Continued)

OTHER PUBLICATIONS

Hui Song; Sencun Zhu; Guohong Cao; "Attack-resilient time synchronization for wireless sensor networks"; Mobile Adhoc and Sensor Systems Conference, 2005. IEEE International Conference on Digital Object Identifier: 10.1109/MAHSS.2005.1542869; Publication Year: Jun. 2005; pp. 1-8.*

(Continued)

*Primary Examiner* — Kambiz Zand
*Assistant Examiner* — Courtney Fields
(74) *Attorney, Agent, or Firm* — Kratz, Quintos & Hanson, LLP

(57) ABSTRACT

A time clock 10, capable of outputting a datum to an USB memory 100 connected thereto, includes a controller authenticating whether or not the USB memory 100 is valid an external apparatus as an output destination to which the datum is output, and determining whether or not the datum is output on the basis of the authentication result. Further, the controller 25 authenticates an external apparatus on the basis of an authentication datum stored in the USB memory 100. The controller 25 performs the authentication on the basis of an identification datum of the time clock and an identification datum included in the authentication datum stored in the external apparatus.

9 Claims, 3 Drawing Sheets

(56) References Cited

U.S. PATENT DOCUMENTS

| | | | |
|---|---|---|---|
| 6,817,537 B2 * | 11/2004 | Watanabe et al. | 235/494 |
| 7,287,703 B2 * | 10/2007 | Son et al. | 235/482 |
| 7,809,953 B2 * | 10/2010 | Little et al. | 713/184 |
| 8,189,997 B2 * | 5/2012 | Sato et al. | 386/252 |
| 2005/0108553 A1 * | 5/2005 | Jakubowski | 713/186 |
| 2008/0121691 A1 * | 5/2008 | King et al. | 235/377 |

FOREIGN PATENT DOCUMENTS

| | | |
|---|---|---|
| CN | 101105868 | 1/2008 |
| DE | 296 09 743 U1 | 10/1996 |
| JP | 59-205690 | 11/1984 |
| JP | 3-235189 | 10/1991 |
| JP | 2006-065885 A | 3/2006 |
| JP | 2006-236127 A1 | 9/2006 |
| WO | WO 2007121617 A1 * | 11/2007 |

OTHER PUBLICATIONS

Notification of Reasons for Refusal received from the Japanese Patent Office on corresponding application No. 2008-203634 dated Jul. 24, 2012 with English translation (6 pages).

Summons for Oral Proceedings received from the German Patent Office on corresponding application No. 11 2009 001 883.1 dated Jul. 16, 2012 with English translation (4 pages).

Office Action dated Nov. 4, 2011 issued in corresponding German Patent Application.

International Search Report for International Application No. PCT/JP2009/062628 dated Sep. 2, 2009.

Office Action issued in corresponding Japan patent application No. 2008-203634 dated Aug. 28, 2012 with English translation.

First Notification of Office Action mailed Sep. 10, 2012 from the State Intellectual Property Office of China in counterpart application No. 200980130419.6 with English translation (12 pages).

* cited by examiner

TIME CLOCK

CROSS-REFERENCE TO RELATED APPLICATION

This application is a continuation of and claims priority to International Patent Application No. PCT/JP2009/062628 filed on Jul. 10, 2009, which claims priority to Japanese Patent Application No. 2008-203634 filed on Aug. 6, 2008, subject matter of these patent documents is incorporated by reference herein in its entirety.

BACKGROUND OF THE INVENTION

1. Field of the Invention

The present invention relates to a time clock.

2. Description of the Related Art

There is conventionally known a time clock storing data such as time stamped data in a memory installed the rein and outputting the stored data to an external computer or a Universal Serial Bus (USB) memory (see Japanese Unexamined Patent Application Publication No. 2006-2361 27). The stored data are output to an external apparatus, thereby allowing managing or storing of the data.

However, in such a time clock, the stored data might be leaked by an unauthorized user.

SUMMARY OF THE INVENTION

It is therefore an object of the present invention to provide a time clock preventing data from being illegally leaked.

According to an aspect of the present invention, there is provided a time clock capable of outputting a datum to an external apparatus connected thereto, the time clock including: an authentication portion authenticating whether or not the external apparatus is valid as an output destination to which the datum is output; and a controller determining whether or not the datum is output on the basis of the authentication result.

DESCRIPTION OF THE PREFERRED EMBODIMENTS

Figure 1:
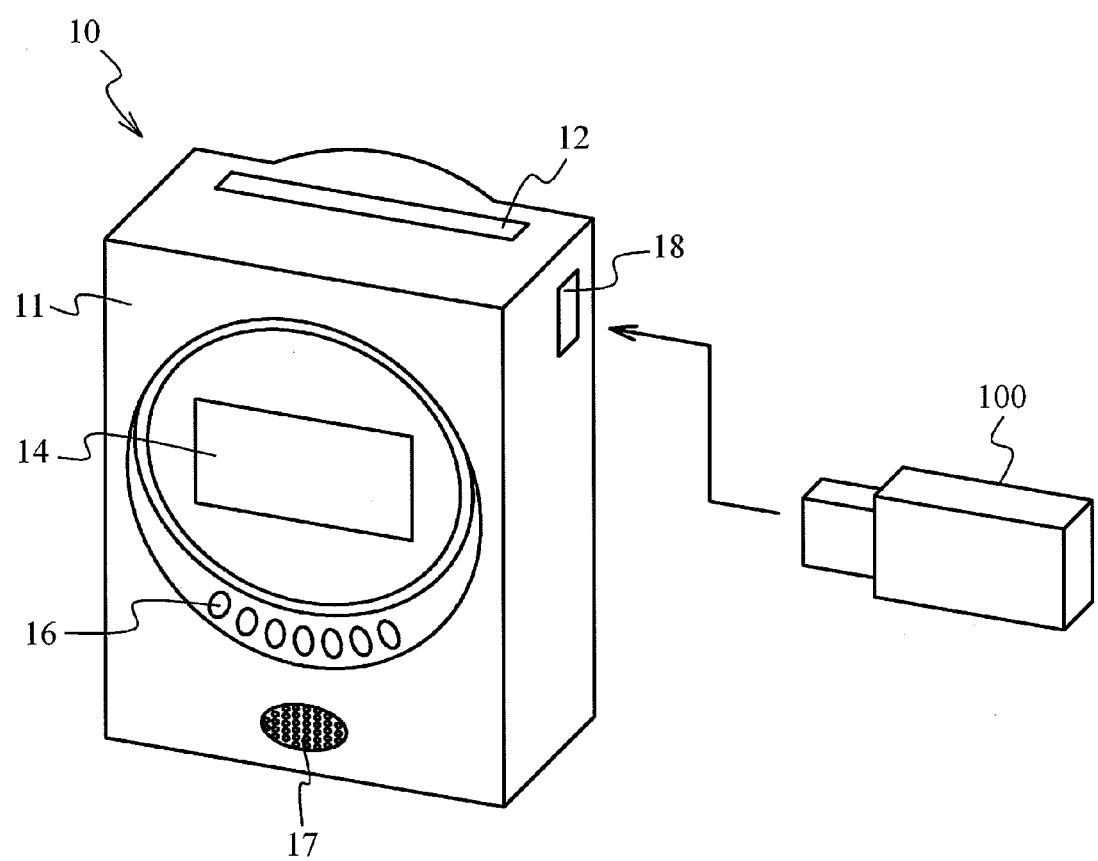
FIG. 1 is an external view of the time clock according to the present embodiment.
Figure 2:
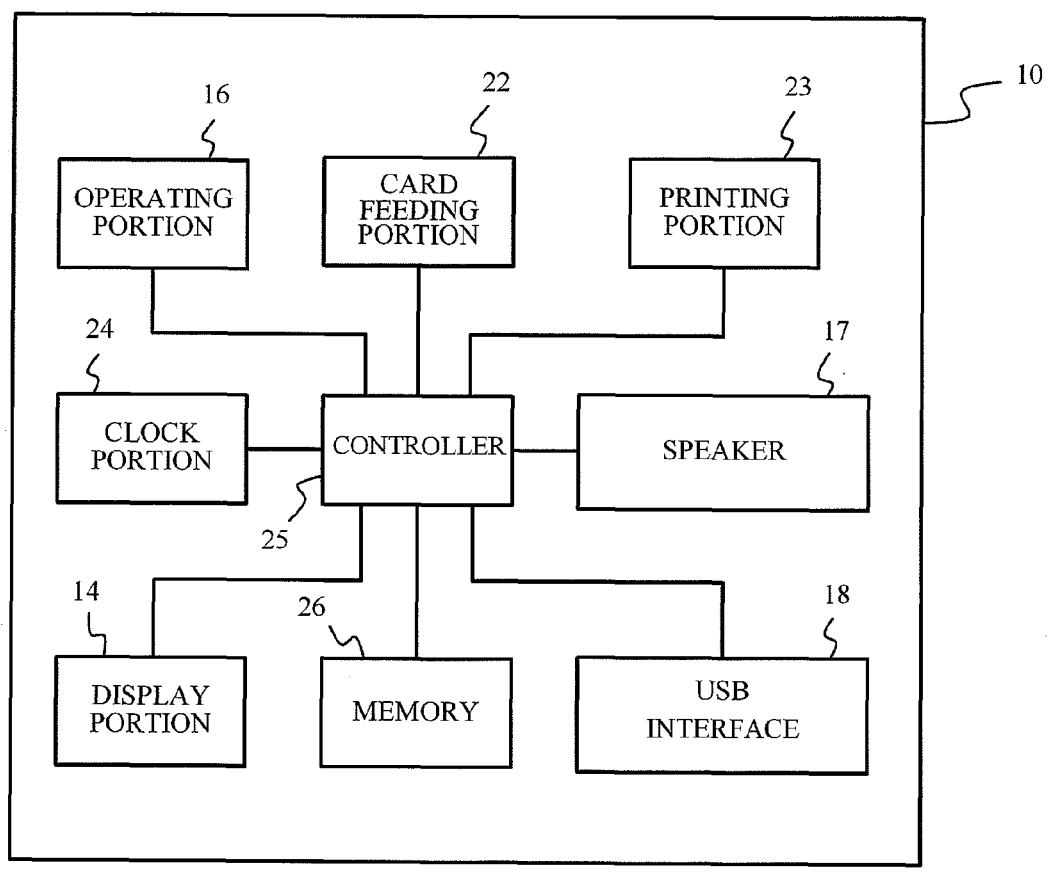
FIG. 2 is a schematic view of the time clock.

An embodiment according to the present invention will be described with reference to the drawings. FIG. 1 is an external view of a time clock 10 according to the present embodiment. FIG. 2 is a schematic view of the time clock 10. The time clock 10 prints the time when a time card is inserted thereto. Also, the time printed on the time card is stored as a time stamping datum in a memory 26 as will be described later, and the stored time stamped data can be output to an external apparatus under a given condition. This will be described later in detail.

As shown in FIG. 1, the time clock 10 is provided at its upper surface with an insertion opening 12. Moreover, the time clock 10 is provided at its front surface with a display portion 14, an operating portion 16, and a speaker 17. The display portion 14 is a liquid crystal display to display a date and time. The speaker 17 outputs warning sound in a given case, as will be described later in detail. The operating portion 16 is used for changing the setting of the time clock 10 and inputting a password as will be described later. The side surface of the time clock 10 is provided with a Universal Serial Bus (USB) interface 18. As is well known, a USB connector is a connector that makes connection by wire-to-wire contacts, i.e., it is a wire connector type of connector.

A card feeding portion 22 sets the position of a time card not shown, and is configured with a motor, a card insertion opening, a card detecting switch, and the like, not shown. The card feeding portion 22 defines the time card inserted into the insertion opening 12. Also, the card feeding portion 22 draws the card by the line to be printed thereon, holds the time card during printing, and ejects the time card after printing to set the vertical position thereof, on the basis of the control by a controller 25.

A printing portion 23 prints a time when the time card is inserted in the printing column thereof. The printing portion 23 includes a printhead, a motor, a carrier, and the like, not illustrated. The printhead is supported by the carrier which is movable horizontally by the driving force of the motor. The printing portion 23 moves the printhead to a horizontal position suitable for a column to be printed, and prints the time transmitted from the controller in the column to be printed, on the basis of the control by the controller 25.

A clock portion 24 is a clock circuit including an oscillator and a counter not shown to times a current time and calendar information (a date, a day, or the like).

The controller 25 includes a Central Processing Unit (CPU), Read Only Memory (ROM) storing given programs, and Random Access Memory (RAM) not shown, and controls the entire operation of the time clock 10. For example, the controller 25 specifies a line and a column to be printed on the basis of the counts of times. Next, the controller 25 controls the card feeding portion 22 and the printing portion 23 to move the printhead toward the column, thereby printing the insertion time of the time card. The RAM is workspace temporally storing the information necessary for the process of the CPU. The ROM stores a program to operate a data output processing as will be described later.

The memory 26 is a nonvolatile memory such as a flash memory. When the controller 25 detects the insertion of the time card, the stamped time is stored in the memory 26. The memory 26 stores time stamped data including the information on these plural stamped times. For example, the time stamped data includes an identification number (identification data) of the time clock 10, a card number, a due date, a date, and the like. The memory 26 stores the identification number of the time clock 10. Additionally, the memory 26 stores a password for permitting the output of the time stamped data. Further, the operating portion 16 is operated so as to output the time stamped data, to set the ID number of the time clock 10, and to set and input the password. Before the time clock 10 is connected to an external apparatus to which the time stamped data is output, it is necessary to set the identification number of the time clock 10 and the password beforehand.

The USB interface 18 is an interface to output data stored in the memory 26 to a USB memory 100.

The controller 25 can output the time stamped data stored in the memory 26 to the USB memory 100 connected to the time clock 10 under a given condition. Specifically, the time clock 10 authenticates whether or not the connected USB memory 100 is valid. Next, when the time clock 10 determines its validity, the time clock 10 verifies an input password. When the input password is correct, the time clock 10 outputs the time stamped data to the connected USB memory 100. The controller 25 corresponds to an authentication portion.

Next, a description will be given of the output of the time stamped data stored in the time clock 10 to an external apparatus. For example, when the time stamped data is output to the USB memory 100, it is necessary for a user to make an authentication file (authentication data) in a root directory of the USB memory 100 beforehand. The authentication file is created by a personal computer in which software to make an authentication file is installed. The authentication file includes data for causing the time clock 10 to determine whether or not the USB memory 100 is a valid output destination to which the time stamped data is output at the time when the time clock 10 is connected with the USB memory 100. The authentication file includes an identification number of the time clock 10 which is an output source of the time stamped data. Also, the authentication file is encrypted to be stored in the USB memory 100.

Thus, for example, in a case where the time stamped data of plural time clocks 10 are collected by a single USB memory 100, it is necessary to make plural authentication files respectively corresponding to plural time clocks in the USB memory 100. The plural authentication files include identification numbers corresponding to the time clocks, respectively. However, when there are plural time clocks 10, it is not necessary to make plural authentication files, and a common identification number may be made to act as a master key for opening a lot of locks. Once this common identification number is set in plural time clocks 10 and the identification number included in the authentication file is changed to the common identification number, a single USB memory has only to have a single authentication file, thereby collecting the time stamped data of plural time clocks 10 in which the common identification number is set.

Figure 3:
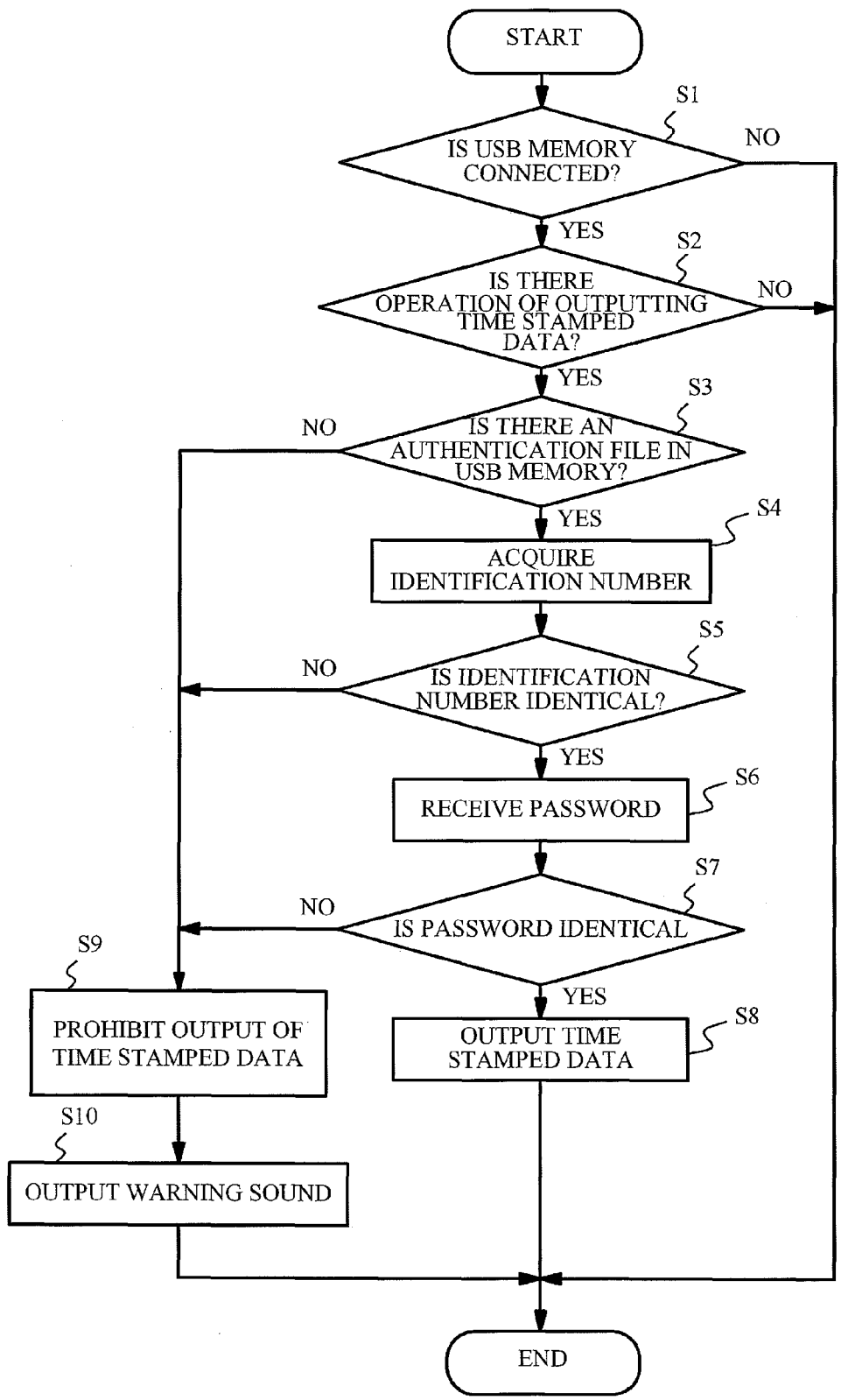
FIG. 3 is a flowchart illustrating an example of the data output process performed by a controller.

Next, a description will be given of an example of the data output process performed by the controller 25. FIG. 3 is a flow chart of an example of the data output process performed by the controller 25.

The controller 25 detects whether or not the USB memory 100 is connected through the USB interface 18 (step S1). When a negative determination is made, this process is finished. When a positive determination is made, the controller 25 determines whether or not the output operation of the time stamped data is performed by the operating portion 16 (step S2). When a negative determination is made, this process is finished.

When a positive determination is made, the controller 25 determines whether or not there is an authentication file in a root directory of the connected USB memory 100 (step S3). When a positive determination is made, the controller 25 opens an authentication file to acquire the identification number stored therein (step S4). Additionally, the controller 25 decrypts the authentication file, because the authentication file stored in the USB memory 100 is encrypted.

Next, the controller 25 compares the acquired identification number with an identification number of the time clock 10 itself stored in the memory 26, or compares the acquired identification number with a common identification number in a case where a common identification number is set, so as to determine whether or not the are identical to each other (step S5). When they are identical to each other, the controller 25 determines the connected USB memory 100 is valid as an output destination to which the data is output, and receives the input of the password (step S6). Additionally, the controller 25 displays a password input screen on the display portion 14 at this time. When a password is input, the controller 25 determines whether or not an input password is identical to a password stored beforehand in the memory 26 (step S7). When they are identical to each other, the controller 25 outputs the time stamped data stored in the memory 26 to the USB memory 100 (step S8). Therefore, the time stamped data is stored in the USB memory 100. In such a way, a user can collect the time stamped data of the time clock 10.

As described above, authentication is carried out to confirm whether or not the USB memory 100 connected to the time clock 10 is valid, and then a user is prompted to input the password, thereby determining whether or not the user is valid. That is, the controller 25 authenticates an external apparatus connected, and then authenticates whether or not a user is valid by a password. Thus, the time clock 10 monitors the output of the data with different methods in twice, thereby preventing the illegal leakage of the information.

In the case where a negative determination is made in step S3 or S5, the controller 25 determines that the connected USB memory 100 is not valid as an output destination to which the data is output, and prohibits the output of the data (step S9). This prevents the illegal leakage of the data. Also, the controller 25 outputs a predetermined warning sound from the speaker 17 (step S10). This can notify a user that the connected USB memory 100 is not valid as an output destination. Also, when a user is an unauthorized one, people around the user can notice it. This can prevent the information from being illegally leaked before happens.

When a negative determination is made in step 7, the controller 25 also performs the processing of steps S9 and S10. This prohibits the output of the time stamped data and notifies people around the user, when a user is an unauthorized one.

While the exemplary embodiments of the present invention have been illustrated in detail, the present invention is not limited to the above-mentioned embodiments, and other embodiments, variations and modifications may be made without departing from the scope of the present invention.

In the above embodiment, the USB memory 100 has been described as an example of an external apparatus. However, an external apparatus may be a personal computer. When a personal computer is connected, the connected apparatus and a user are also authenticated respectively by an authentication file and a password. Moreover, when a negative determination is made in step S7, the warning sound is output (step 10). However, when a positive determination is made in step S7, the speaker 17 may be caused to output sound such as melody other than the warning sound while the data is being output to the USB memory 100. If the melody stops, a user can understand that the output of the data is finished, thereby preventing the user from mistakenly disconnecting the USB memory 100 while the data is being output.

What is claimed is:

1. A time clock capable of outputting data through a time-clock wire connector into a portable-electronic-memory wire connector of a portable electronic memory connected to the time clock, the portable electronic memory being connectable to the time clock for data transfer therebetween, and disconnectable from the time clock, the time clock comprising:

a clock portion including an oscillator and a counter, to provide a current time;

the time-clock wire connector;

a printer that, when a time card is inserted into an insertion opening of the time clock, prints the current time on the time card, and also stores the current time in a time-clock memory;

an authentication portion of the time clock, authenticating whether or not the portable electronic memory is valid as an output destination to which the data is output, wherein the authentication portion authenticates the portable electronic memory on the basis of an authentication datum stored in the portable electronic memory; and a controller determining whether or not the data is to be output on the basis of the authentication result, when the portable electronic-memory-connector is connected with the time-clock connector;

wherein the authentication portion authenticates the portable electronic memory on the basis of an identifier included in the authentication datum stored in the portable electronic memory, and further authenticates the portable electronic memory by a password input to the time clock by a user of the portable electronic memory.

2. The time clock of claim 1, wherein there are a plurality of the time clocks, and each of the respective authentication portions thereof authenticates the portable electronic memory on the basis of a common identification datum provided in each of the time clocks and included in the authentication datum stored in the portable electronic memory.

3. The time clock of claim 1, wherein the authentication portion determines whether or not sound is output from a notice portion on the basis of the authentication result, or determines a kind of sound to be output on the basis of the authentication result.

4. The time clock of claim 1, wherein the data includes a time stamped datum.

5. In combination, a time clock and a portable electronic memory that is disconnectable from the time clock and connectable to the time clock for data transfer therebetween, comprising:

the time clock, including an oscillator and a counter, to provide a current time;

a time-clock wire connector and a portable-electronic-memory wire connector mating with the time-clock wire connector;

a printer that, when a time card is inserted into an insertion opening of the time clock, prints the current time on the time card, and also stores the current time in a time-clock memory;

an authentication datum stored in the portable electronic memory;

a password stored in the time clock;

an authentication portion of the time clock authenticating whether or not the portable electronic memory is valid as an output destination to which time clock data is output, wherein the authentication portion authenticates the portable electronic memory on the basis of the authentication datum stored in the portable electronic memory; and a controller, comprised in the time clock, determining whether or not the time clock data is to be output on the basis of the authentication result, when the portable electronic-memory-connector is connected with the time-clock connector;

wherein the authentication portion authenticates the portable electronic memory on the basis of an identifier included in the authentication datum stored in the portable electronic memory, and further authenticates the external electronic memory by the password input to the time clock by a user of the portable electronic memory.

6. The time clock of claim 1, wherein the time-clock wire connector and the portable-electronic-memory wire connector are USB connectors.

7. The time clock of claim 5, wherein the time-clock wire connector and the portable-electronic-memory wire connector are USB connectors.

8. The time clock of claim 1, wherein the clock portion provides calendar information.

9. The combination of claim 5, wherein the time clock provides calendar information.

* * * * *